US 7,853,569 B2

(12) United States Patent
Mukhi et al.

(10) Patent No.: US 7,853,569 B2
(45) Date of Patent: Dec. 14, 2010

(54) SYNCHRONIZING HISTORICAL ARCHIVE DATA BETWEEN PRIMARY AND SECONDARY HISTORIAN SYSTEMS

(75) Inventors: Sultan Q. Mukhi, Sugar Land, TX (US); Emtiaz A. Momin, Stafford, TX (US); Prabhakara R. Vinta, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 414 days.

(21) Appl. No.: 11/771,557

(22) Filed: Jun. 29, 2007

(65) Prior Publication Data

US 2009/0006499 A1    Jan. 1, 2009

(51) Int. Cl.
*G06F 17/30* (2006.01)

(52) U.S. Cl. .................................... 707/668
(58) Field of Classification Search ............... 707/661, 707/610, 665, 667, 668, 671, 672
See application file for complete search history.

(56) References Cited

U.S. PATENT DOCUMENTS

| 5,325,522 | A |   | 6/1994  | Vaughn |
|-----------|---|---|---------|--------|
| 5,333,315 | A |   | 7/1994  | Saether et al. |
| 5,511,190 | A |   | 4/1996  | Sharma et al. |
| 5,636,036 | A |   | 6/1997  | Ashbey |
| 5,819,296 | A |   | 10/1998 | Anderson et al. |
| 5,867,483 | A |   | 2/1999  | Ennis, Jr. et al. |
| 5,943,688 | A | * | 8/1999  | Fisher et al. ............... 711/162 |
| 6,041,420 | A |   | 3/2000  | Skarpelos et al. |
| 6,311,184 | B1|   | 10/2001 | Horiguchi et al. |
| 6,647,415 | B1|   | 11/2003 | Olarig et al. |
| 6,668,619 | B2| * | 12/2003 | Yang et al. ............... 73/40.5 R |
| 6,907,505 | B2|   | 6/2005  | Cochran et al. |
| 7,161,487 | B1|   | 1/2007  | Tracey et al. |
| 7,428,604 | B2|   | 9/2008  | Black |
| 2002/0112116 | A1 | | 8/2002 | Nelson |
| 2003/0149702 | A1 | | 8/2003 | Saffer et al. |
| 2004/0254949 | A1 | | 12/2004 | Amirthalingam |

(Continued)

FOREIGN PATENT DOCUMENTS

WO    2007/014221 A2    2/2007

(Continued)

OTHER PUBLICATIONS

PCT Search Report and Written Opinion for PCT/IB2008/050583.

(Continued)

*Primary Examiner*—James Trujillo
*Assistant Examiner*—Fatima P Mina
(74) *Attorney, Agent, or Firm*—Donna Blalock Holguin

(57) ABSTRACT

Techniques for operating an archival database, referred to as a historian, are disclosed. Embodiments of the invention provide techniques for synchronizing historical archive files and/or archival data between a primary and a secondary historian used to archive data values from a real-time database. The real-time database may be used to monitor the current operational state of a large industrial system, such as a pipeline. In turn, the historian may be used to archive the data stored by the real-time database. In the event that either the primary or the secondary system (or both) goes down and then comes back online at a later time, embodiments of the invention may be used to synchronize data between the primary and secondary historian systems.

28 Claims, 6 Drawing Sheets

U.S. PATENT DOCUMENTS

| | | | |
|---|---|---|---|
| 2005/0262322 A1 | 11/2005 | Ma | |
| 2006/0059181 A1 | 3/2006 | Hutchins et al. | |
| 2006/0253499 A1 | 11/2006 | Zhao | |
| 2006/0259948 A1* | 11/2006 | Calow et al. | 726/1 |
| 2007/0027936 A1 | 2/2007 | Stakutis et al. | |
| 2007/0136324 A1 | 6/2007 | Xu et al. | |
| 2007/0185913 A1 | 8/2007 | Reichert et al. | |
| 2007/0269117 A1 | 11/2007 | Ernvik et al. | |
| 2008/0215641 A1* | 9/2008 | Mukhi | 707/204 |

OTHER PUBLICATIONS

US Office Action dated Apr. 14, 2009 for U.S. Appl. No. 11/681,063.
US Office Action dated Nov. 5, 2009 for U.S. Appl. No. 11/681,063.
US Office Action dated Feb. 16, 2010 for U.S. Appl. No. 11/681,063.

* cited by examiner

SYNCHRONIZING HISTORICAL ARCHIVE DATA BETWEEN PRIMARY AND SECONDARY HISTORIAN SYSTEMS

BACKGROUND

Generally, a pipeline system provides a continuous pipe conduit along with a variety of related components and equipment, e.g., valves, compressor stations, communications systems, and meters, etc. Pipelines are frequently used to transport liquid or gaseous materials from one point to another, usually from a point (or points) of production or processing to another or to points of use. For example, an air separation unit may be used at a production facility to separate atmospheric air into gaseous components (e.g., oxygen gas ($O_2$) nitrogen gas ($N_2$), Argon gas (Ar), etc.). The resulting materials may be transported through the pipeline. At compressor stations, compressors maintain the pressure of the material in the pipeline as it is transported from one site to another. Similarly, for a liquid bearing pipeline, pumps may be used to introduce and maintain pressure of a liquid substance transported by the pipeline.

Obviously, running and maintaining a pipeline system can be expensive and complex. The operations of a pipeline system are frequently coordinated and controlled from a central operations control center. At such a control center, an operator may monitor the operational state of the pipeline and each of its constituent elements. To perform this task, software applications are available that monitor the operational state of pipeline components, including compressors and pumps, valves, segments, etc. Sensors affixed to these (and other) field devices are configured to relay information regarding a then current state of the device to the control center. A real-time status database is used to capture this information and make it available to the relevant individuals at the control center. In some cases, the monitoring systems may be configured to raise an alarm when a monitored parameter (or combination of parameters) falls below (or climbs above) a predetermined value.

Other complex industrial systems and processes use a similar approach. For example, a petroleum refinery (at one end of a pipeline) may be monitored from a central control center using a real-time status database configured to receive data collected from the field devices of the refinery. Fleet management applications used to monitor the location and status of a fleet of delivery vehicles provide another example of a large complex operation that may be monitored from a central control center using a real-time status database.

For these systems, a central concern is the ongoing operational state of the system at any given point in time, and the real-time status database is an effective tool for monitoring this. Frequently however, system operators need access to not just the current status available from the real-time database, but also to historical data regarding the operational state of the system. Accordingly, the control center for a pipeline (or other industrial system) may include a "historian database," or more simply, a "historian." A historian is used to archive values from the real-time status database for the monitored field devices. That is, while the real-time status database may record the current pressure at a given pipeline location, the historian may store what the same value was a minute, hour, day week, or even years ago. The historian may be queried for historical values by the relevant individuals at the control center. Such information may be needed for a variety of purposes, including, for example, optimizing system operations, understanding the impact of changes over time, ensuring regulatory compliance, and many other applications. Thus, the historian database often becomes a critical component for ongoing operations of a pipeline (or other industrial system).

Ideally, whenever any value in the real-time database changes, the previous value should be archived by the historian. Additionally, some values may need to be archived at regular intervals, regardless of whether the value has changed. If the historian should fail, for any reason, this information may be lost. Because of the importance of this historical data, pipeline (or other industrial system) operators may use a second historian to provide redundancy in case of failure. Should a primary historian go down, a secondary (or back-up) historian may take over archiving values from the real-time status database. By using a redundant back-up, a system operator avoids losing valuable archival data when a primary historian goes down.

Eventually, a failed historian system may be brought back on line. Problems arise, however, as the primary and secondary historian systems are, essentially, meant to be duplicates of one another. When one historian is brought back on-line, it needs to be synchronized with the other system. One approach to synchronizing the historian systems is to replicate the complete historical archive from the historian system that did not fail to the one that did. Given the scope of many industrial operations, the volume of data to replicate may simply make such an approach impractical, at best. For example, pipeline systems are frequently large and complex with hundreds, if not thousands, of monitored field devices, and thousands, if not tens-of-thousands, of monitored parameters, and potentially terabytes of data. Other large industrial operations are often just as complex.

Further, the synchronization process may need to go both ways between the primary and the secondary historians. For example, a system problem may result in intermittent outages where both the primary and the secondary go down at different times. In such a case, the primary and the secondary historian may both have archival data that needs to be synchronized with the other. In such cases, the simple replication approach is inadequate.

As the foregoing discussion demonstrates, providing a fault-tolerant historian is a difficult task for operators of a complex industrial operation such as a pipeline. Accordingly, there remains a need in the art for techniques for synchronizing a primary and a secondary historian system used to archive values from a real-time status database.

SUMMARY

Embodiments of the invention provide techniques for synchronizing historical archive files and/or archival data between a primary and a secondary archival database, referred to as a historian, used to record values from a real-time database. The real-time database may be used to monitor the current operational state of a large industrial system, such as a pipeline. In turn, the historian may be used to archive the data stored by the real-time database. In the event that either the primary or the secondary system (or both) goes down and then comes back online at a later time, embodiments of the invention may be used to synchronize data between the primary and secondary historian systems.

One embodiment of the invention is a method for archiving data values from a real-time database in a first and second historian system, where the first and second historian systems each include a short-term repository and a long-term archive. The method generally includes identifying one or more data values in the short-term repository of the first historian system. The data values are stored in the short term-repositories of the first and second historian systems as tags that each include a timestamp, a tag ID identifying a monitored parameter in the real-time database, and a value for the monitored value. The method also includes copying the tags storing the one or more identified data values from the short-term repository of the first historian system to the long-term archive of the first historian system, and upon determining that the long-term archive of the second historian system is available, the tags storing the one or more identified data values from the short-term repository of the first historian system are copied to the long-term archive of the second historian system. Otherwise, upon determining that the long-term archive of the second historian system is not available, the method also includes setting a flag in a mask file for each tag ID present in the tags storing the one or more identified data values. The flag may be used to identify which tags need to be synchronized in the long-term archive of the second historian system when it subsequently becomes available.

Another embodiment of the invention includes a computer-readable storage medium containing a program for archiving data values from a real-time database in a first historian system and in a second historian system, where each of the first and second historian systems includes a short-term repository and a long-term archive. The program may be generally configured to perform an operation that includes identifying one or more data values in the short-term repository of the first historian system. The data values may be stored in the short term-repositories of the first and second historian systems as tags that each include a timestamp, a tag ID identifying a monitored parameter in the real-time database, and a value for the monitored value. The operation also includes copying the tags storing the one or more identified data values from the short-term repository of the first historian system to the long-term archive of the first historian system, and upon determining that the long-term archive of the second historian system is available, copying the tags storing the one or more identified data values from the short-term repository of the first historian system to the long-term archive of the second historian system. Otherwise, upon determining that the long-term archive of the second historian system is not available, the operation also includes setting a flag in a mask file for each tag ID present in the tags storing the one or more identified data values. The flag may be used to identify which tags need to be synchronized in the long-term archive of the second historian system when it subsequently becomes available.

Still another embodiment of the invention includes a system for archiving data values from a real-time database in a first historian system and in a second historian system, where each of the first and second historian systems includes a short-term repository and a long-term archive. The system generally includes a real-time database configured to store a current value for the plurality of monitored data values. Each of the plurality of data values correspond to information reflecting an operational parameter of one or more monitored devices. The system also includes the first and second historian systems, wherein the first and second historian systems each includes a short-term repository and a long term archive. The first historian system may generally be configured to identify one or more data values in the short-term repository of the first historian system. Each of the data values may be stored in the short term-repositories of the first and second historian systems as a tag that includes a timestamp, a tag ID identifying a monitored parameter in the real-time database, and a value for the monitored value. The first historian system may be configured to copy the tags storing the one or more identified data values from the short-term repository of the first historian system to the long-term archive of the first historian system, and upon determining that the long-term archive of the second historian system is available, to copy the tags storing the one or more identified data values from the short-term repository of the first historian system to the long-term archive of the second historian system. Otherwise, if the first historian system determines that the long-term archive of the second historian system is not available, the first historian system may set a flag in a mask file for each tag ID present in the tags storing the one or more identified data values. The flag may be used to identify which tags need to be synchronized in the long-term archive of the second historian system when it subsequently becomes available.

Still another embodiment of the invention provides a method for synchronizing a second historian system with a first historian system after a period of after a period of time where the second historian system was unavailable, where each of the first and second historian systems includes a short-term repository and a long-term archive. The method generally includes accessing, by the second historian system, a mask file of the first historian system, and identifying a tag ID associated with a flag in the mask file of the first historian system. Each data value stored in the short term-repositories of the first and second historian systems may be stored as a tag that includes a timestamp, a tag ID identifying a monitored parameter in the real-time database, and a value for the monitored value. The method also includes determining a timestamp for a most recent tag having the identified tag ID stored in the long-term archive of the second historian and identifying one or more tags in the first historian system which have the identified tag ID and also have a timestamp greater than the determined timestamp of the most recent tag in the second historian system. The method also includes copying the identified one or more tags from the long-term archive of the first historian system to the long-term archive of the second historian system and resetting the flag in the mask file of the first historian system.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
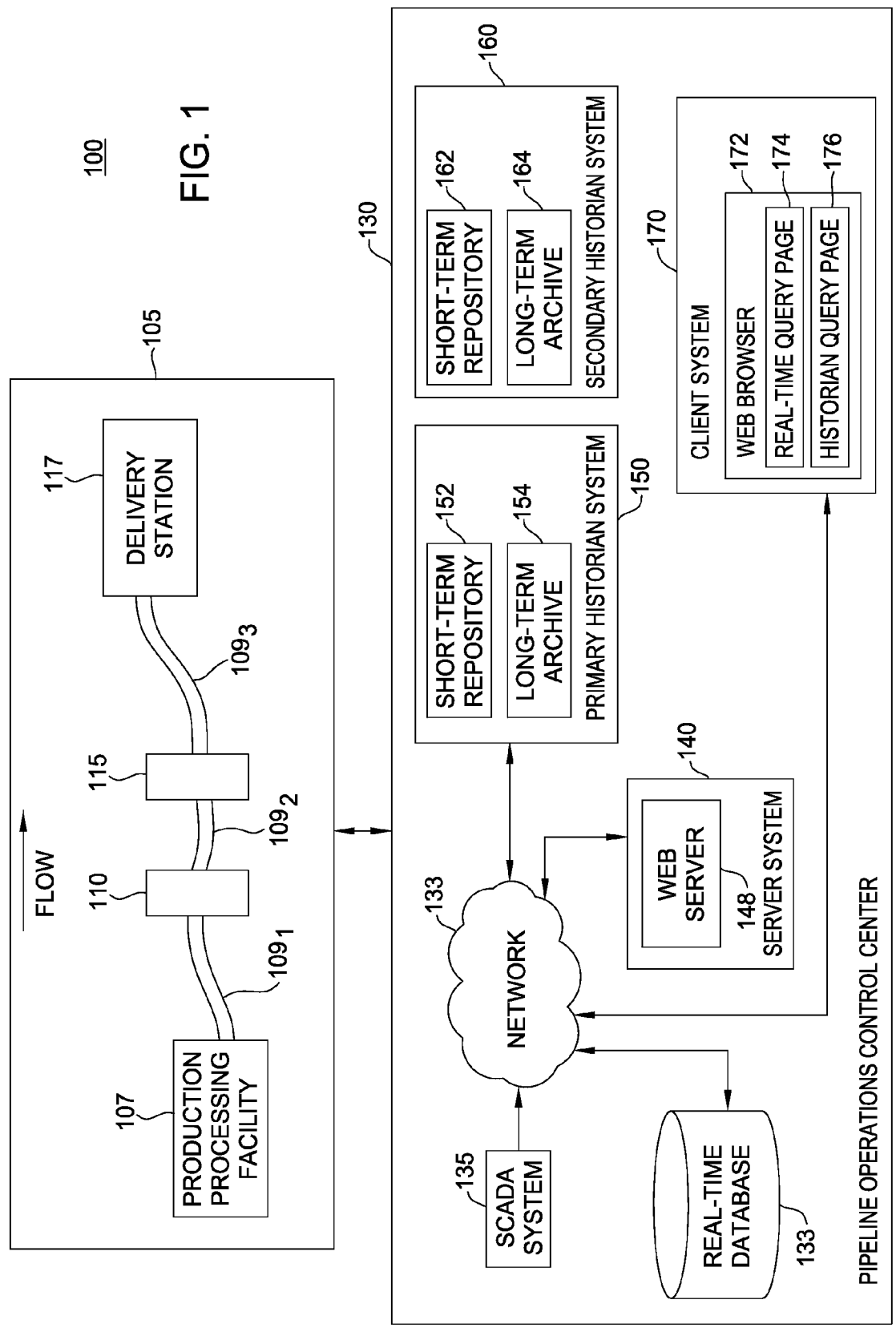
FIG. 1 is a conceptual illustration of a monitored pipeline and an operations control center, according to one embodiment of the invention.

Embodiments of the invention provide techniques for operating an archival database, referred to as a historian. The historian may be used to archive values from a real-time database, and the real-time database may be used to monitor the current operational state of a large industrial system, such as a pipeline. Further, embodiments of the invention provide techniques for synchronizing historical archive files and/or archival data between a primary and a secondary historian. In the event that either the primary or the secondary system (or both) goes down and then comes back online at a later time, embodiments of the invention may be used to synchronize data between the primary and secondary historian systems.

In one embodiment, data from the real-time database may be archived in the both the primary and secondary historian systems using either periodic monitoring or exception monitoring. The monitoring modes address how and when data values are copied from the real-time database into the historian. As the name implies, periodic monitoring is used to update data in the historian at specific time intervals, regardless of whether an operational state value in the real-time database has changed. In contrast, exception monitoring is used to update data values in the historian whenever a specified event occurs (e.g., a change in the value in the real-time database above a given threshold). Depending on the operational value or field device being monitored, exception monitoring or periodic monitoring may be more appropriate, and both modes are frequently used to monitor different parameters of a system and to archive values from the real-time database in the historian.

Additionally, embodiments of the invention are described relative to a primary and secondary historian used to archive data from a real-time status database reflecting a then current operational state of a gas pipeline network. However, one of ordinary skill in the art will recognize that the historian disclosed herein may be adapted for use with a variety of complex, industrial operations that are monitored using a real-time status database.

One embodiment of the invention may be implemented as one or more software programs for use with a computer system. The program(s) include instructions for performing embodiments of the invention (including the methods described herein) and may be stored on a variety of computer-readable storage media. Illustrative computer-readable media includes: (i) non-writable storage media on which information is permanently stored (e.g., read-only memory devices within a computer such as CD-ROM or DVD-ROM disks readable by a CD-ROM or DVD-ROM drive) and/or (ii) writable storage media on which alterable information is stored (e.g., floppy disks within a diskette drive, hard-disk drives, or flash memory devices). Other media include communications media through which information is conveyed to a computer, such as a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

Further, the description herein references embodiments of the invention. However, it should be understood that the invention is not limited to any specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In general, the routines executed to implement the embodiments of the invention, may be part of an operating system or a specific application, component, program, module, object, or sequence of instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a conceptual illustration of a monitored pipeline 105 and an operations control center 130, according to one embodiment of the invention. As shown, monitored pipeline network 105 includes a production/processing facility 107 and a delivery station 117. Facility 107 may represent, for example, a molecular gas generation plant that includes one or more air separation units used to purify gaseous substances from the ambient atmosphere. The resulting product is delivered to station 117 over a pressurized pipeline. Illustratively, pipeline 105 includes pipeline segments $109_1$, $109_2$, and $109_3$. Additionally, pipeline 105 includes compressor stations 110 and 115 used to maintain the pressure of gaseous substances transported over pipeline 105.

Compressor stations 110 and 115 may include sensor equipment used to monitor aspects of the operational state of pipeline 105. For a pressurized gas pipeline, for example, a wide variety of field devices and parameters may be monitored including, for example, inlet gas pressure, outlet gas pressure, gas temperature, cooling liquid temperature, flow rates, and power consumption, among others. Similarly, the operational state of various field devices, air separation units, and equipment at production facility 107 and delivery station 117 may be monitored by sensor equipment. Of course, for other industrial networks and/or systems, the sensors and/or monitoring equipment may be selected to suit the needs of a particular case.

In one embodiment, the results of the monitoring equipment are transmitted to the pipeline operations control center 130. The pipeline operation control center 130 may employ a number of computer systems running application programs used to coordinate, monitor, and control the operations of pipeline 105. Illustratively, pipeline operations control center 130 includes a SCADA system 135 (short for Supervisory Control and Data Acquisition), a server system 140, a primary historian system 150, a secondary historian system 160 and a client system 170, communicating with one another over a network 133. The computer systems 135, 140, 150, 160, and 170 illustrated as part of operations control center 130 are included to be representative of existing computer systems, e.g., desktop computers, server computers, laptop computers, tablet computers and the like. However, embodiments of the invention are not limited to any particular computing system, application, device, architecture or network, and instead, may be adapted to take advantage of new computing systems and platforms as they become available. Additionally, one skilled in the art will recognize that the illustrations of computer systems 135, 140, 150, 160, and 170 are simplified to highlight aspects of the present invention and that computing systems and networks typically include a variety of components not shown in FIG. 1.

SCADA system 135 centralizes process data and allows remote monitoring and control of pipeline 105. As is known, a SCADA system 135 may be configured to gather data in real time from remote locations in order to control equipment and conditions in pipeline 105. The monitored data may be stored in real-time database 133. In one embodiment, real-time database 133 stores a number of data tags, where each tag identifies a monitored parameter of pipeline 105 and the current operational value of that parameter. The tags may be written into real-time database 133 periodically, where the value for a tag is updated at regular intervals, or exception based, where a new value for a tag is written into real-time database 133 only when the monitored value changes more than a predetermined value. SCADA system 135 may include both hardware and software components. The hardware gathers and feeds data into SCADA system 135, which processes this data and presents it to a user on client system 170.

Figure 3:
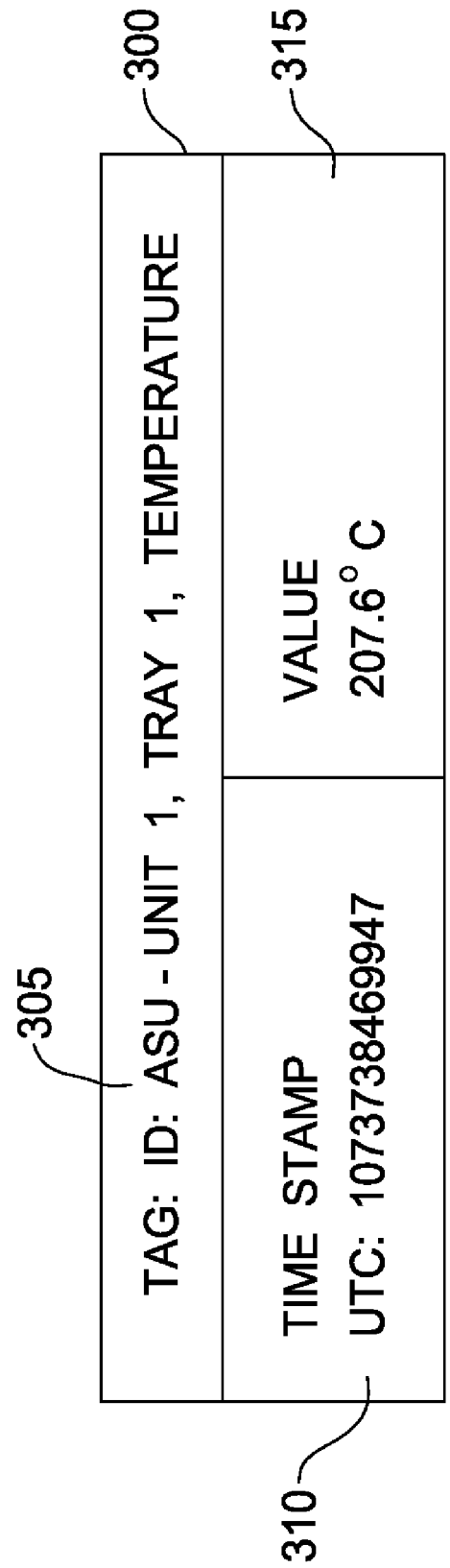
FIG. 3 is a conceptual illustration of a data tag recording a monitored value for a field device at a specific point in time, according to one embodiment of the invention.

In one embodiment, each tag may include an event ID (specifying which event or field device the tag is about) a monitored value (e.g., a pressure or temperature reading) and a timestamp (indicating when the reading for the event occurred). For example, FIG. 3 is a conceptual illustration of tag 300 recording a monitored value for a field device at a specific point in time, according to one embodiment of the invention. As shown, tag 300 includes a tag ID 305, a time stamp 310 and a tag value 315. Illustratively, tag 300 represents a tag recording a value for a monitored air separation unit. In this case, tag 300 records a temperature of "207.6° C." for "tray 1" of "ASU Unit 1."

Referring again to FIG. 1, primary historian system 150 includes a short-term repository 152 and a long-term archive 154. In one embodiment, primary historian system 150 may be configured to retrieve (or receive) tags from real-time database 133, and store the tags in short-term repository 152. Over time, data tags in the short-term-repository 152 may be moved to long-term archive 154. Further, short-term repository 152 may be a high-speed memory mapped database and long-term archive 154 may be a high-capacity disk based database. Thus, the short-term repository 152 may be used to provide fast access to the recent operational history of the pipeline 105, where long-term archive 154 may be used to provide access to a comprehensive operational history of pipeline 105.

Like primary historian system 150, secondary historian system 160 includes a short-term repository 162 and a long term archive 164. Secondary historian system 160 may also be configured to retrieve (or receive) tags from real-time database 133 and to store the tags in short-term repository 164. Over time, data tags in the short-term repository 162 may be moved to long-term archive 164. Short-term repository 162 may be a high-speed memory mapped database and long term archive 164 may be a high-capacity disk based database. Thus, secondary historian system 160 may provide fully redundant back-up system for primary historian system 150. In the event primary historian system 150 goes down (e.g., due to a system crash or loss of network connectivity), secondary historian system 160 may be "promoted" to take the place of primary historian system 150. Further, in one embodiment, when the primary historian system 150 is restored, data in short-term repositories 152 and 162 and long-term archives 154 and 164 may be synchronized with one another, effectively reestablishing the fully redundant back-up provided by primary historian system 150 and secondary historian system 160.

As shown, client system 170 includes a user-interface used to access data from real-time database 133 and primary historian 150. For example, client system 170 may include a web browser 172 used to access a real-time query page 174, and a historian query page 176. Pages 174 and 176 may include the appropriate interface elements to compose and perform queries of short term repository 152 and long term archive 154. Web server 148 may be configured to provide a specific service to client software (e.g., web browser 172). As is known, web server 148 is a software application configured to manage and share web based applications accessible using other computers connected by a network. In the context of the present invention, the web server 148 may be configured to retrieve values from real time database 133 and historian 150 and transmit this information to client computer system 170. For example, web server 148 may be configured to transmit HTML web pages rendered by web browser 172, where the content of the web pages presents the information from real-time database 133 and historian 150 to a user in a structured format. Because secondary historian 160 provides an essentially complete redundant copy of primary historian 150, client system 170 may also access secondary historian 160 in a similar manner.

Note, although real-time database 133, server system 140, primary historian system 150, secondary historian 160, and client system 170, are shown as separate components, one of ordinary skill in the art will recognize that these components may be applications running on a single computer system, or on multiple computer systems, and further, that these components may be configured in a variety of ways.

Figure 2:
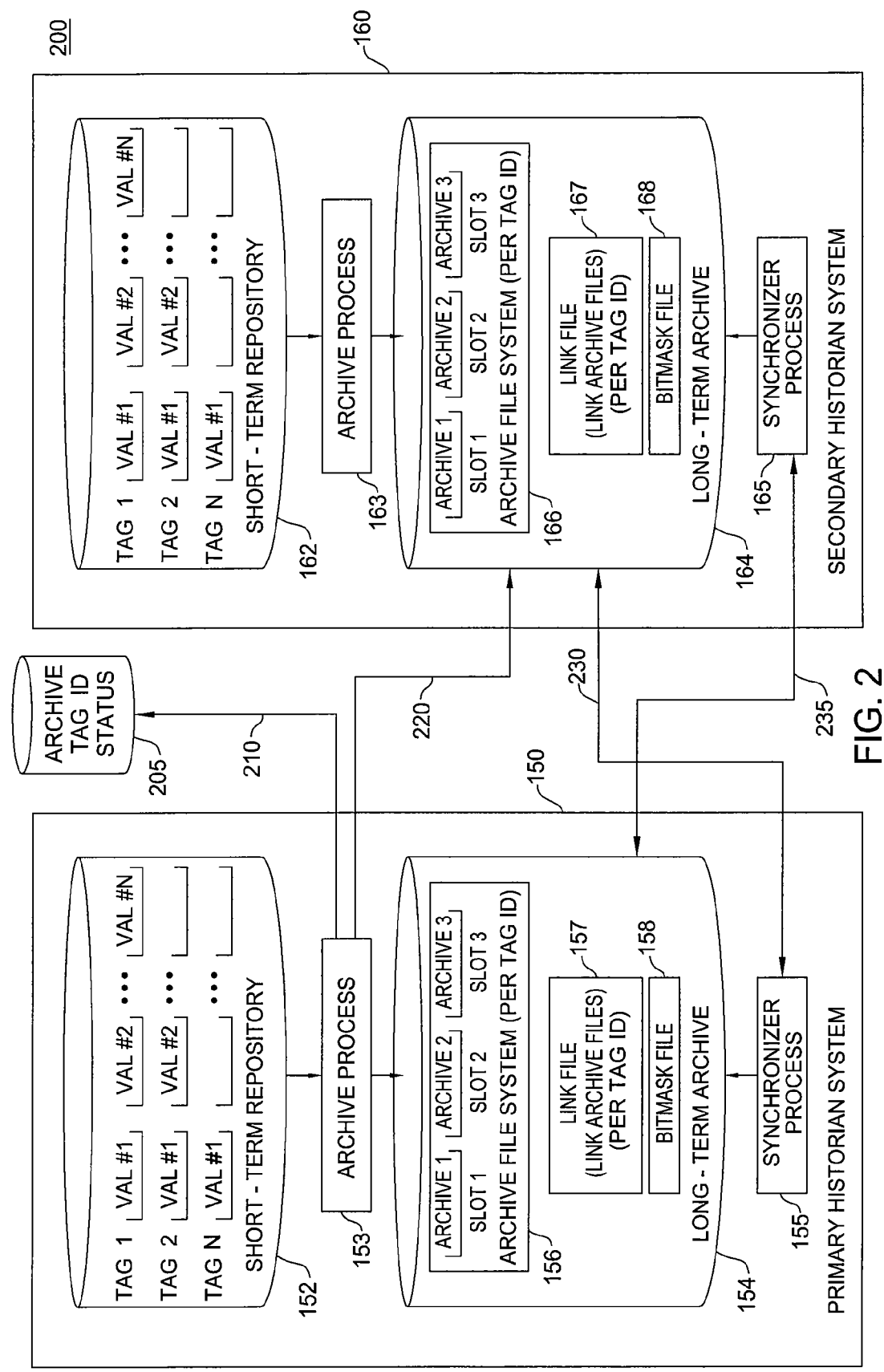
FIG. 2 is a conceptual illustration of components of primary historian system and secondary historian system, according to one embodiment of the invention.

FIG. 2 is a conceptual illustration of components of primary historian system 150 and secondary historian system 160, according to one embodiment of the invention. As shown, primary historian system 150 includes software applications used to manage tags as they are archived from real-time database 133 to short-term repository 152 and, over time, to long-term archive 154. Specifically, primary historian system 150 includes an archive process 153 and a synchronizer process 155. In one embodiment, each "tag" may be an instance of a data structure used to store a value being archived from real-time database 133 to primary historian 150 (shown in FIG. 2 as "Val#1," "Va#l2," etc.) In other words, each instance of a tag may be used to record a value for a particular monitored field device at a particular point in time. For example, a tag may store a monitored temperature or pressure value for a field device at one of compressor stations 110 or 115 of FIG. 1, measured at the specific time indicated by the tag.

In one embodiment, archive process 153 may be a software application configured to copy tags from short-term repository 152 to long-term archive 154. As stated, short-term repository 152 may be a high-speed memory mapped database. When configured this way, each type of tag may be allocated memory to store a specific number of instances of that tag (referred to as slots). For example, as illustrated, short-term repository 152 includes a fixed number of slots for tags of type "Tag1," "Tag2," and "TagN." Further, each slot allocated for "Tag1" stores a data value (i.e., an instance of a tag), while only a single slot allocated for "TagN" stores a tag. In one embodiment, once the slots for a given tag in short-term repository 152 are full, archive process 153 may be configured to move the tags for that tag type from the allocated slots to long-term archive 154. Alternatively, archive process 153 may be configured to periodically move tags from short-term repository 152, regardless of how many tags are then currently present in short-term repository 152, or when a certain percentage of slots allocated for a given tag are full. An archive tag ID status database 205 may be used to store records indicating which tags are currently in which archive files stored in long-term repository 154 for each different tag type, and archive process 153 may be configured to update archive Tag ID status database 205 whenever tags are moved from short-term repository 152 to long-term archive 154, as indicated by an arrow 210.

As shown, long term archive 154 includes a plurality of archive file slots 156, a plurality of link files 157, and a bitmask file 158. As stated, long-term archive 154 may be a high-capacity disk-based database. When configured this way, long-term archive 154 may allocate storage for one or more archive files for each type of tag archived therein. For example, as shown, archive file slots 156 include an "archive1" file in slot 1, an "archive 2" file in slot 2 and an "archive 3" file in slot 3. In one embodiment, each of these archive files may provide a relatively fixed-size data structure used to store tags of a given type. Although other sizes may be used, in this example, assume each archive file stores roughly 10 megabytes of data tags for a given tag type. Because the tags are stored sequentially based on a time-stamp, each archive file may store tags for a readily determined period; namely, the time period between the time-stamps of the first and last tag in a given archive file. Additionally, each archive file may include a header structure indicating the contents of that archive file.

In one embodiment, archive process 153 copies tags of a given type from short-term repository 152 to the archive file for the first slot allocated for that tag type, updating the header structure of that archive file and creating the archive file if necessary. Further, once an archive file reaches a defined maximum size (e.g., 10 Mb), archive process 153 may be configured to shift the archive file in the first slot to the second. And if necessary, archive process 153 may shift an archive file in the second slot to the third slot etc. This may include renaming files or moving files from one location in a directory structure to another. Additionally, archive process 153 may update the header for a given archive file. If an archive file is present in the last slot (slot three in this example), then archive process 153 may be configured to move the archive file in that slot to link file 157. Link file 157 may aggregate a collection of 1 to N archive files for a given tag type. In a large system, such as a historian for a large, complex industrial operation, link file 157 may help keep the number of data structures and/or files in long term archive 154 manageable. At the same time, because each archive file includes a limited number of tags (e.g., 10 Mb), the archive file containing any particular tag may be accessed relatively quickly. Further, in the event that the amount of data warrants it, link file 157 may be aggregated into additional data structures, i.e., a file storing a collection of link files 157. Additionally, each link file 157 may include a header structure indicating the contents of that link file 157.

As stated, archive process 153 may be configured to copy tags from short-term repository 152 to long term archive 154 of primary historian system 150. Further, in one embodiment, archive process 153 may copy tags to long-term archive 164 of secondary historian system 160 (as indicated by an arrow 220). That is, archive process 153 may update both primary historian system 150 and secondary system 160, when tags are drained from short term repository 152. Thus, archive process 153 may copy tags to an archive file in archive file slot 166; shift archive files in archive file slots 166; and move archive files from the last archive file slot 166 to link file 167, as described above.

Bitmask file 158 may provide an array of bits, where each bit represents one of the different tag types stored in primary historian system 150. In the event archive process 153 is unable to copy tags of a given type to long-term archive 164 of secondary historian system 160, then the archive process 153 may flag the bit associated with that tag type as needing to be synchronized. That is, archive process 153 keeps track of which archive files are updated for any time period that secondary historian 160 is unavailable by flagging bits in bitmask file 158. Similarly, in the event that primary historian system 150 goes down for any reason, then secondary historian system 160 may be promoted to perform the functions of primary historian system 150 during a time when primary historian system 150 is unavailable. During such a time, archive process 163 of secondary system 160 may become active and move tags from short-term repository 162 to long-term archive 164. Further, while doing so, archive process 163 may flag bits in a bitmask file 168 associated with updated tag types as needing to be synchronized in primary historian 150 when it subsequently becomes available. In one embodiment, the secondary system may maintain the role as "primary" when primary historian 150 becomes available. In such a case, primary historian 150 may take over the role of secondary historian 160. In other words, the relative functions of the primary historian 150 and secondary historian 160 may be swapped with one another. Alternatively when primary historian 150 subsequently becomes available after a period of downtime, secondary historian 160 may be "demoted" back to the original role as "secondary."

In either case, after primary historian system 150 or secondary historian system 160 becomes available after a period of downtime, the long-term archive associated with that historian system needs to be synchronized to account for any changes that occurred to the long-term archive of the other historian during the period of downtime. In one embodiment, a synchronizer process 155 may be configured to synchronize the long-term archive 154 after a period of downtime of primary historian system 150. In such a case, synchronizer process 155 may read bitmask file 168 to identify which tags were updated in long-term archive 164 during a period of time where primary historian system 150 was unavailable (as indicated by an arrow 230). For each bit flagged in bitmask 168, synchronizer process 155 may identify the most recent tag (of the flagged type) stored in long-term archive 152, as well as the most recent tag (of the flagged type) stored in long-term archive 162. Using this information, synchronizer process 155 may identify which tags need to be copied from archive files in long-term archive 164 of secondary historian system 160 to long-term archive 154 of primary historian system 150. That is, synchronizer process 155 may identify which tags were added to the long-term archive 164 of secondary historian system 160 during a period of downtime of primary historian system 150. For example, each archive file in archive file slots 156, 166 may include a header structure indicating a timestamp for a first and last tag archived in the archive files. Further, as each archive file is a relatively fixed size (e.g., 10 Mb), synchronizer process 155 may typically be able to access and copy tags from these files in a reasonable amount of time. Once data for a given tag type is synchronized between long-term archive 154 and long-term archive 164, synchronizer process 155 may clear the flag in bitmask file 168 associated with that tag type.

Similarly, from the other direction, a synchronizer process 165 may be configured to synchronize the long-term archive 164 after a period of downtime of secondary historian system 160. Synchronizer process 165 may operate in the same manner as described for synchronizer process 155 to update long-term archive 164, as indicated by an arrow 235. Thus, synchronizer process 165 may identify and copy tags from long-term archive 154 to synchronize long-term archive 164 after a period of downtime of secondary historian system 160, and clear a flag in bitmask file 158 when data related to a given tag type is synchronized.

Figure 4:
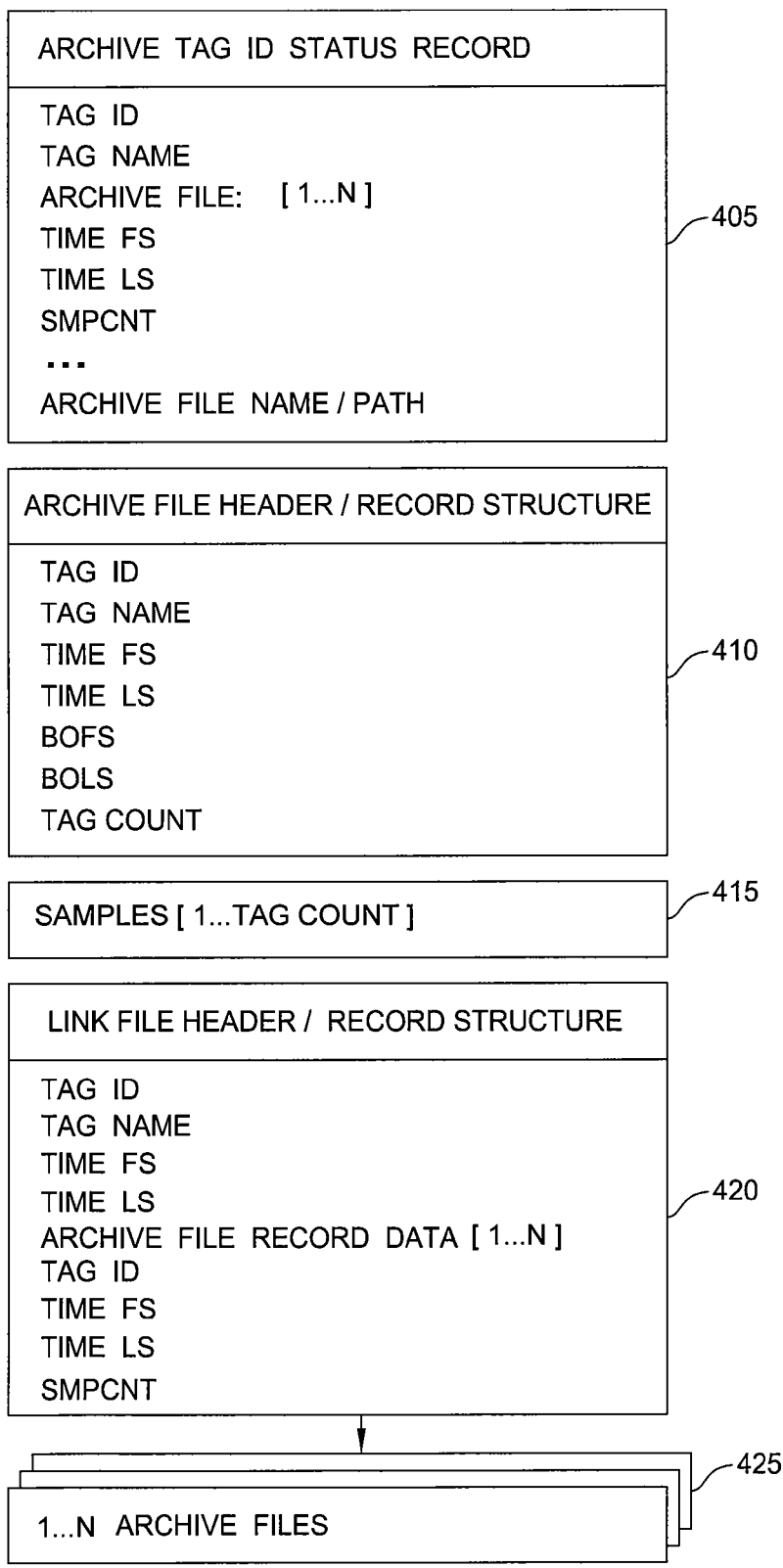
FIG. 4 is a conceptual illustration of data structures used in an archive historian, according to one embodiment of the invention.

FIG. 4 is a conceptual illustration of data structures used in an archive historian, according to one embodiment of the invention. Specially, FIG. 4 illustrates a tag ID status record 405, a header structure 410 for a long-term archive file archiving a plurality of tags 415, and a header structure 420 for a link file archiving a plurality of archive files 425.

Illustratively, tag ID status record 405 includes a Tag ID and a name indicating which tag type status record 405 refers. In one embodiment, tag ID status records 405 may be generated for each tag type. For each given tag type, status record 405 includes data related to tags stored in [1 . . . N] archive files. In the example, above, slots were allocated for up to three archive files, and thus N=3. For each of the [1 . . . N] archive files, status record 405 includes a time for a first tag, a time for the last tag, a number of tags, and a name and/or path location of that archive file in a long-term repository.

Header structure 410 stores data related to the plurality of tags 415 stored by a given archive file. As shown, header structure 410 includes a Tag ID, a Tag name, a timestamp for a first tag and a timestamp for a last tag in a given archive file. Also as shown, header structure 410 includes a byte offset specifying a position of a first tag in the archive file (BOFS), a byte offset specifying a last tag in the archive file (BOLS), and a sample count specifying the number of tags 415 in a given archive file. In one embodiment, the tags associated with a given Tag ID are all the same size and any tag may be accessed using the tag size and BOFS value.

Header structure 420 stores data related to the plurality archive files 425 stored by a link file. As shown, header structure 410 includes a Tag ID, a Tag name, a timestamp for a first tag and a timestamp for a last tag in a link file. Also, header structure 420 includes [1 . . . N] archive file records, one for each archive file 425 aggregated into a given link file. Each archive file record specifies information regarding which tags are stored in a particular archive file in the link file, along with a reference to that archive file.

Figure 5:
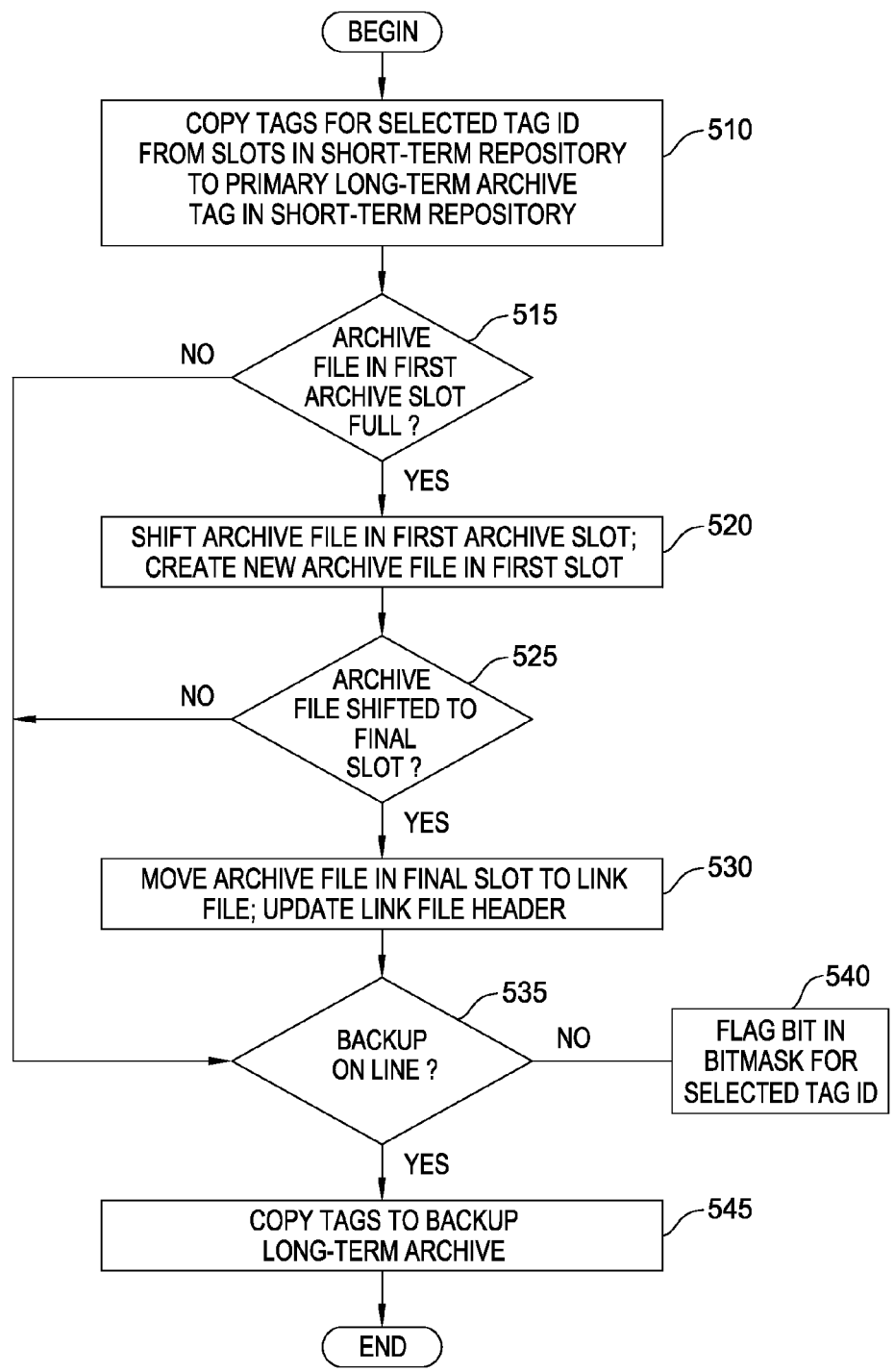
FIG. 5 is a flow diagram illustrating the operations of a primary and secondary historian system used to archive a real-time status database, according to one embodiment of the invention.

FIG. 5 is a flow diagram illustrating a method 500 for a primary and secondary historian system to archive a real-time status database, according to one embodiment of the invention. As shown, method 500 begins at step 505, where archive process 153 of primary historian 150 determines a set of tags of a given type to move from short-term repository 152 to long-term archive 154.

At step 510, archive process 153 may copy tags of the selected tag type from slots in short term-repository 152 to an archive file in long-term archive 154. In one embodiment, the tags may be stored in the archive file in an order based on the timestamp values associated with each tag. At step 510, archive process 153 may determine whether the archive file in the first archive slot is full. For example, as described above, the archive files may be configured to have a relatively 10 Mb maximum size. In such a case, if the batch of tags added to the archive file at step 510 causes the archive file to grow above this 10 Mb limit, then at step 520, the archive file in the first slot may be shifted to the second slot. Additionally, archive process 153 may create a new, empty, archive file in the first slot of long-term archive 154. Further, as described, long-term archive 154 may be configured to allocate slots for a specified number of archive files (three in the example above). Accordingly, at step 525, if the shifting of archive files performed at step 520 results in an archive file being "shifted" out of the last archive slot (the third slot in the example above), then at step 530, that archive file may be moved into a link file. Additionally, in such a case, the link file associated with that tag type may be updated to reflect the newly added archive file.

At step 530, archive process 153 may determine whether the secondary historian system 160 is available. If so, then at step 545, archive process 153 may be configured to copy the tags moved from short-term repository 152 at step 510 to the long-term archive 164 of secondary historian system 160. Thus, if both primary historian system 150 and secondary historian system 160 are available and running properly, the archive process may update the long-term archives 154, 164 of both. However, at step 540, if archive process 153 determines that secondary historian system 160 is unavailable, then the archive process 153 may flag a bit in bitmask file 158 corresponding to the tag type identified at step 505. Thereafter, when secondary historian 160 subsequently becomes available, synchronizer process 165 running on secondary historian 160 may be configured to synchronize the long-term archive 164 with long-term archive 154.

Figure 6:
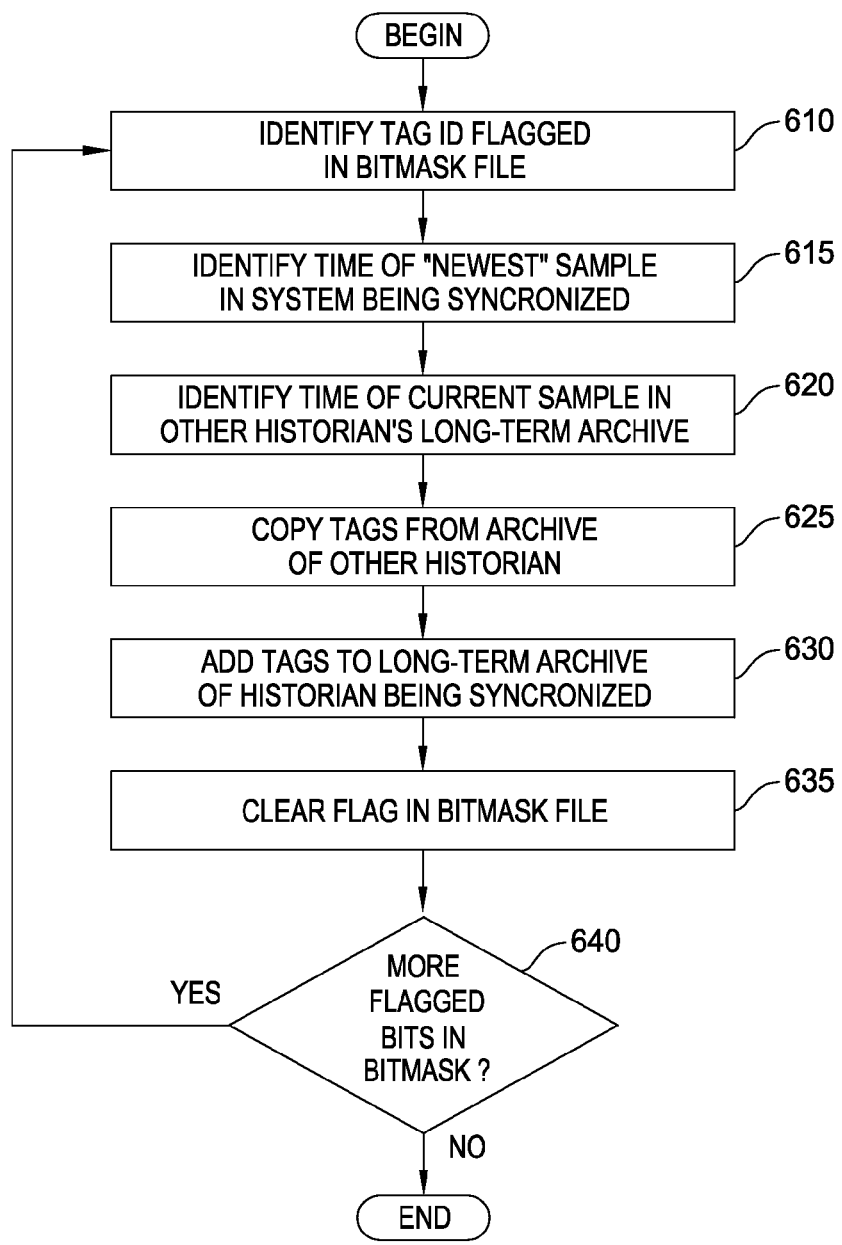
FIG. 6 is a flow diagram illustrating operations for synchronizing a primary and secondary archive historian used to archive a real-time status database, according to one embodiment of the invention.

FIG. 6 is a flow diagram illustrating a method 600 for synchronizing a long-term archives of a primary and secondary historian used to archive a real-time status database, according to one embodiment of the invention. As shown, method 600 begins at step 610, where a synchronizer process running on a first historian system identifies a type of tag that needs to be synchronized. For example, assume that primary historian 150 goes down for some period of time. During this period, secondary historian 160 archives tags from short-term repository 152 to long-term archive 164. Additionally, as described, for the time period primary historian 150 is unavailable, archive process 163 flags bits in bitmask file 168 corresponding to tags updated in long term-archive 164. In such a case, at step 610, after the primary historian 150 becomes available, the synchronizer process 155 may identify which tags types need to be synchronized by parsing bitmask file 168 on secondary historian 160.

At step 610, the synchronizer process may identify the timestamp of the most recent tag (of the tag-type identified at step 605) added to the long-term archive of the historian system being synchronized. In the above example, synchronizer process 155 identifies the most recent tag in long-term archive 154 of primary historian 150. At step 620, the synchronizer process may identify the timestamp of the most recent tag (of the tag-type identified at step 605) added to the long-term archive of the other historian system. That is, the one that includes the updated tags. In the above example, synchronizer process 155 identifies the most recent tag in long-term archive 164 of secondary historian 160.

At step 625, based on the timestamps identified at steps 615 and 620, the synchronizer process may copy tags from the long-term archive of the other historian to the long-term archive of the historian system being synchronized. In the above example, synchronizer process 155 copies tags from the long-term archive 164 of secondary historian 160 with time stamps more recent that the timestamp identified at step 615. In one embodiment, synchronizer process 155 may use the header records associated with the archive files in long-term archive 164 to identify the set of tags that need to be copied. At step 630, the tags copied from the long-term archive of the "other" historian system added to the long-term archive of the historian being synchronized. In one embodiment, this process may be similar to method 500. That is, the synchronizer process may add tags to the long term archive, shifting archive files in the allocated slots, or adding "full" archive files to link file, as necessary. After synchronizing tags of a given tag type, synchronizer process 155 may determine whether other bits in bitmask 168 are flagged as needing to be synchronized. If so, method 600 returns to step 610 and synchronizes another tag type. Otherwise, synchronization is complete, and method 600 ends.

Although method 600 is described in terms of primary historian 150 synchronizing itself with data from the long-term archive 164 of secondary historian 160, one of ordinary skill in the art will recognize that secondary historian 160 may synchronize itself with primary historian 150 after some period of downtime in an essentially identical manner. And further, that after intermittent outages, both primary historian 150 and secondary historian 160 may perform method 600 essentially simultaneously, each historian system relying on the bitmask file of the other to identify which tags need to be synchronized.

As described, a secondary historian system may provide a redundant fail-over for a primary historian system. The historian systems may be used to archive values from a real-time database, and the real-time database may be used to monitor the current operational state of a large industrial system, such as a pipeline. Further, embodiments of the invention provide techniques for synchronizing historical archive files and/or archival data between the primary and secondary historian. In the event that either the primary or secondary historian systems (or both) goes down and then comes becomes available at a later time, embodiments of the invention may be used to synchronize data between the primary and secondary historian systems that was archived on one of these systems while one the other was down.

It will be understood, however, that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A computer-implemented method of archiving data values from a real-time database in a first historian system and in a second historian system, wherein each of the first and second historian systems includes a short-term repository and a long-term archive, comprising:

identifying one or more data values in the short-term repository of the first historian system, wherein each of the data values are stored in the respective short term-repositories of the first and second historian systems as a tag that includes a timestamp, a tag ID identifying a monitored parameter in the real-time database, and a value for the monitored parameter;

copying the tags storing the one or more identified data values from the short-term repository of the first historian system to the long-term archive of the first historian system, wherein copying the tags comprises copying the tags to one of a plurality of archive files, wherein each archive file has a pre-determined maximum size, and wherein each archive file is associated with a given tag ID;

upon determining that the long-term archive of the second historian system is available, copying the tags storing the one or more identified data values from the short-term repository of the first historian system to the long-term archive of the second historian system; and upon determining that the long-term archive of the second historian system is not available, setting a flag in a mask file for each tag ID present in the tags storing the one or more identified data values.

2. The method of claim 1, wherein the short-term repositories of the first and second historian systems are each a memory-mapped database.

3. The method of claim 1, wherein the long-term archives of the first and second historian systems are a disk-based database.

4. The method of claim 1, further comprising:

after a period of time where the second historian system is unavailable, restoring the second historian system;

accessing, by the second historian system, the mask file of the first historian system, identifying a tag ID associated with the flag in the mask file of the first historian system;

determining a timestamp for the most recent tag having the identified tag ID stored in the long-term archive of the second historian;

identifying one or more tags in the first historian system which have the identified tag ID and have a timestamp greater than the determined timestamp of the most recent tag in the second historian system; and copying the identified one or more tags from the long-term archive of the first historian system to the long-term archive of the second historian system.

5. The method of claim 1, wherein the real-time status database is a supervisory control and data acquisition (SCADA) system configured to monitor operational status of a pipeline.

6. The method of claim 1, wherein copying the tags storing the one or more identified data values from the short-term repository of the first historian system to the long-term archive of the first historian system further comprises:

determining that a first archive file associated with the given tag ID has reached the pre-determined maximum size;

closing the first archive file; and opening a second archive associated with the given tag ID file in the long-term archive of the first historian system.

7. The method of claim 1, wherein each archive file includes a header indicating a timestamp of a most recent tag in that archive file and a timestamp of an oldest tag in that archive file.

8. The method of claim 6, further comprising, aggregating two or more archive files associated with the given tag ID into a single link file.

9. The method of claim 8, wherein the link file includes a header indicating a timestamp of a most recent tag and a timestamp of an oldest tag for each archive file aggregated in the link file.

10. A computer-readable storage medium containing a program for archiving data values from a real-time database in a first historian system and in a second historian system, wherein each of the first and second historian systems includes a short-term repository and a long-term archive, the program including instructions for performing an operation, comprising:

identifying one or more data values in the short-term repository of the first historian system, wherein each of the data values are stored in the respective short term-repositories of the first and second historian systems as a tag that includes a timestamp, a tag ID identifying a monitored parameter in the real-time database, and a value for the monitored parameter;

copying the tags storing the one or more identified data values from the short-term repository of the first historian system to the long-term archive of the first historian system, wherein copying the tags comprises copying the tags to one of a plurality of archive files, wherein each archive file has a pre-determined maximum size, and wherein each archive file is associated with a given tag ID;

upon determining that the long-term archive of the second historian system is available, copying the tags storing the one or more identified data values from the short-term repository of the first historian system to the long-term archive of the second historian system; and upon determining that the long-term archive of the second historian system is not available, setting a flag in a mask file for each tag ID present in the tags storing the one or more identified data values.

11. The computer-readable storage medium of claim 10, wherein the short-term repositories of the first and second historian systems are each a memory-mapped database.

12. The computer-readable storage medium of claim 10, wherein the long-term archives of the first and second historian systems are a disk-based database.

13. The computer-readable storage medium of claim 10, wherein the operations further comprise:

after a period of time where the second historian system is unavailable, restoring the second historian system;

accessing, by the second historian system, the mask file of the first historian system, identifying a tag ID associated with the flag in the mask file of the first historian system;

determining a timestamp for the most recent tag having the identified tag ID stored in the long-term archive of the second historian;

identifying one or more tags in the first historian system which have the identified tag ID and have a timestamp greater than the determined timestamp of the most recent tag in the second historian system; and copying the identified one or more tags from the long-term archive of the first historian system to the long-term archive of the second historian system.

14. The computer-readable storage medium of claim 10, wherein the real-time status database is a supervisory control and data acquisition (SCADA) system configured to monitor operational status of a pipeline.

15. The computer-readable storage medium of claim 10, wherein copying the tags storing the one or more identified data values from the short-term repository of the first historian system to the long-term archive of the first historian system further comprises:

determining that a first archive file associated with the given tag ID has reached the pre-determined maximum size;

closing the first archive file; and opening a second archive associated with the given tag ID file in the long-term archive of the first historian system.

16. The computer-readable storage medium of claim 10, wherein each archive file includes a header indicating a timestamp of a most recent tag in that archive file and a timestamp of an oldest tag in that archive file.

17. The computer-readable storage medium of claim 15, wherein the operations further comprise aggregating two or more archive files associated with the given tag ID into a single link file.

18. The computer-readable storage medium of claim 17, wherein the link file includes a header indicating a timestamp of a most recent tag and a timestamp of an oldest tag for each archive file aggregated in the link file.

19. A system, comprising at least one processor and further comprising:

a real-time database, wherein the real-time database is configured to store a current value for the plurality of monitored data values, and wherein each of the plurality of data values correspond to information reflecting an operational parameter of one or more monitored devices; and a first and second historian systems, wherein the first and second historian systems each includes a respective short-term repository and long term archive, and wherein the first historian system is configured to:

identify one or more data values in the short-term repository of the first historian system, wherein each of the data values are stored in the respective short term-repositories of the first and second historian systems as a tag that includes a timestamp, a tag ID identifying a monitored parameter in the real-time database, and a value for the monitored parameter, copy the tags storing the one or more identified data values from the short-term repository of the first historian system to the long-term archive of the first historian system, wherein copying the tags comprises copying the tags to one of a plurality of archive files, wherein each archive file has a pre-determined maximum size, and wherein each archive file is associated with a given tag ID, upon determining that the long-term archive of the second historian system is available, copy the tags storing the one or more identified data values from the short-term repository of the first historian system to the long-term archive of the second historian system, and upon determining that the long-term archive of the second historian system is not available, set a flag in a mask file for each tag ID present in the tags storing the one or more identified data values.

20. The system of claim 19, wherein the short-term repositories of the first and second historian systems are each a memory-mapped database.

21. The system of claim 19, wherein the long-term archives of the first and second historian systems are a disk-based database.

22. The system of claim 19, wherein the second historian system is configured to:

after a period of time where the second historian system was unavailable, access the mask file of the first historian system, identify a tag ID associated with the flag in the mask file of the first historian system;

determine a timestamp for the most recent tag having the identified tag ID stored in the long-term archive of the second historian;

identify one or more tags in the first historian system which have the identified tag ID and have a timestamp greater than the determined timestamp of the most recent tag in the second historian system; and copy the identified one or more tags from the long-term archive of the first historian system to the long-term archive of the second historian system.

23. The system of claim 19, wherein the real-time status database is a supervisory control and data acquisition (SCADA) system configured to monitor operational status of a pipeline.

24. The system of claim 19, wherein the fist historian system is further configured to copy the tags storing the one or more identified data values from the short-term repository of the first historian system to the long-term archive of the first historian system by:

determining that a first archive file associated with the given tag ID has reached the pre-determined maximum size;

closing the first archive file; and opening a second archive associated with the given tag ID file in the long-term archive of the first historian system.

25. The system of claim 19, wherein each archive file includes a header indicating a timestamp of a most recent tag in that archive file and a timestamp of an oldest tag in that archive file.

26. The system of claim 24, further comprising, aggregating two or more archive files associated with the given tag ID into a single link file.

27. The system of claim 26, wherein the link file includes a header indicating a timestamp of a most recent tag and a timestamp of an oldest tag for each archive file aggregated in the link file.

28. A computer-implemented method for synchronizing a second historian system with a first historian system after a period of time where the second historian system was unavailable, wherein each of the first and second historian systems includes a short-term repository and a long-term archive, comprising:

accessing, by the second historian system, a mask file of the first historian system, identifying a tag ID associated with a flag in the mask file of the first historian system, wherein each data value stored in the short term-repositories of the first and second historian systems are stored as a tag that includes a timestamp, a tag ID identifying a monitored parameter in the real-time database, and a value for the monitored parameter;

determining a timestamp for a most recent tag having the identified tag ID stored in the long-term archive of the second historian;

identifying one or more tags in the first historian system which have the identified tag ID and also have a timestamp greater than the determined timestamp of the most recent tag in the second historian system;

copying the identified one or more tags from the long-term archive of the first historian system to the long-term archive of the second historian system, wherein copying the identified one or more tags comprises copying the tags to one of a plurality of archive files, wherein each archive file has a pre-determined maximum size, and wherein each archive file is associated with a given tag ID; and resetting the flag in the mask file of the first historian system.

* * * * *

UNITED STATES PATENT AND TRADEMARK OFFICE
CERTIFICATE OF CORRECTION

PATENT NO. : 7,853,569 B2
APPLICATION NO. : 11/771557
DATED : December 14, 2010
INVENTOR(S) : Sultan Q. Mukhi et al.

It is certified that error appears in the above-identified patent and that said Letters Patent is hereby corrected as shown below:

Column 13, line 53—Column 14, line 14, Claim 1 should read

Claim 1.     A computer-implemented method comprising:
archiving data values from a real-time database in a first historian system and in a second historian system, wherein the real-time database is a supervisory control and data acquisition (SCADA) system and each of the first and second historian systems includes a short-term repository and a long-term archive,
identifying one or more data values in the short-term repository of the first historian system, wherein each of the data values are stores in the respective short-term repositories of the first and second historian systems as a tag that includes a timestamp, a tag ID identifying a monitored parameter in the real-time database, and a value for the monitored parameter;
copying the tags storing the one or more identified data values from the short-term repository of the first historian system to the long-term archive of the first historian system;
upon determining that the long-term archive of the second historian system is available, copying the tags storing the one or more identified data values from the short-term repository of the first historian system to the long-term archive of the second historian system;
wherein copying the tags comprises copying the tags to one of a plurality of archive files, wherein each archive file has a pre-determined maximum size, and wherein each archive file is associated with a given tag ID; and
upon determining that the long-term archive of the second historian system is not available, setting a flag in a mask file for each tag ID present in the tags storing the one or more identified data values.

Column 14, lines 39-42, Claim 5 should read

Claim 5.     The method of claim 1, wherein the supervisory control and data acquisition (SCADA) system is configured to monitor operational status of a pipeline.

Signed and Sealed this
Twenty-seventh Day of March, 2012

David J. Kappos
*Director of the United States Patent and Trademark Office*

CERTIFICATE OF CORRECTION (continued)
U.S. Pat. No. 7,853,569 B2

Column 14, line 64—Column 15, line 27, Claim 10 should read

Claim 10. A computer-readable storage medium comprising:
providing a program for archiving data values from a real-time database in a first historian system and in a second historian system, wherein the real time database is a supervisory control and date acquisition (SCADA) system and each of the first and second historian systems includes a short-term repository and a long-term archive, the program including instructions for performing an operation;
identifying one or more data values in the short-term repository of the first historian system, wherein each of the data values are stored in the respective short-term repositories of the first and second historian systems as a tag that includes a timestamp, a tag ID identifying a monitored parameter in the real-time database, and a value for the monitored parameter;
copying the tags storing the one or more identified data values from the short-term repository of the first historian system to the long-term archive of the first historian system;
upon determining that the long-term archive of the second historian system is available, copying the tags storing the one or more identified data values from the short-term repository of the first historian system to the long-term archive of the second historian system;
wherein copying the tags comprises copying the tags to one of a plurality of archive files, wherein each archive file has a pre-determined maximum size, and wherein each archive file is associated with a given tag ID; and
upon determining that the long-term archive of the second historian system is not available, setting a flag in a mask file for each tag ID present in the tags storing the one or more identified data values.

Column 15, lines 53-56, Claim 14 should read

Claim 14. The computer-readable storage medium of claim 10, wherein the supervisory control and data acquisition (SCADA) system is configured to monitor operational status of a pipeline.

Column 16, lines 13-48, Claim 19 should read

Claim 19. A system, comprising at least one processor and further comprising:
a real-time database, wherein the real-time database is a supervisory control and data acquisition (SCADA) system and is configured to store a current value for the plurality of monitored data values, and wherein each of the plurality of data values correspond to information reflecting an operational parameter of one or more monitored devices; and
a first and second historian systems, wherein the first and second historian systems each includes a respective short-term repository and long-term archive, and wherein the first historian system is configured to:
identify one or more data values in the short-term repository of the first historian system, wherein each of the data values are stored in the respective short-term repositories of the first and second historian systems as a tag that includes a timestamp, a tag ID identifying a monitored parameter in the real-time database, and a value for the monitored parameter,

CERTIFICATE OF CORRECTION (continued)
U.S. Pat. No. 7,853,569 B2 copy the tags storing the one or more identified data values from the short-term repository of the first historian system to the long-term archive of the first historian system, upon determining that the long-term archive of the second historian system is available, copy the tags storing the one or more identified data values from the short-term repository of the first historian system to the long-term archive of the second historian system, wherein copying the tags comprises copying the tags to one of a plurality of archive files, wherein each archive file has a pre-determined maximum size, and wherein each archive file is associated with a given tag ID; and upon determining that the long-term archive of the second historian system is not available, set a flag in a mask file for each tag ID present in the tags storing the one or more identified data values.

Column 17, lines 10-20, Claim 24 should read

Claim 24. The system of claim 19, wherein the first historian system is further configured to copy the tags storing the one or more identified data values from the short-term repository of the first historian system to the long-term archive of the first historian system by:

determining that a first archive file associated with the given tag ID has reached the pre-determined maximum size;

closing the first archive file; and opening a second archive associated with the given tag ID file in the long-term archive of the first historian system.

Column 17, line 32—Column 18, line 31, Claim 28 should read

Claim 28. A computer-implemented method comprising:

synchronizing a second historian system with a first historian system after a period of time where the second historian system was unavailable, wherein each of the first and second historian systems includes a short-term repository and a long-term archive, identifying a tag ID associated with a flag in the mask file of the first historian system, wherein each data value stored in the short-term repositories of the first and second historian systems are stored as a tag that includes a timestamp, a tag ID identifying a monitored parameter in a real-time database that is a supervisory control and data acquisition (SCADA) system, and a value for the monitored parameter;

determining a timestamp for a most recent tag having the identified tag ID stored in the long-term archive of the second historian;

identifying one or more tags in the first historian system which have the identified tag ID and also have a timestamp greater than the determined timestamp of the most recent tag in the second historian system;

copying the identified one or more tags from the long-term archive of the first historian system to the long-term archive of the second historian system; wherein copying the identified one or more tags comprises copying the tags to one of a plurality of archive files, wherein each archive file has a pre-determined maximum size, and wherein each archive file is associated with a given tag ID; and resetting the flag in the mask file of the first historian system.